Figure 1:
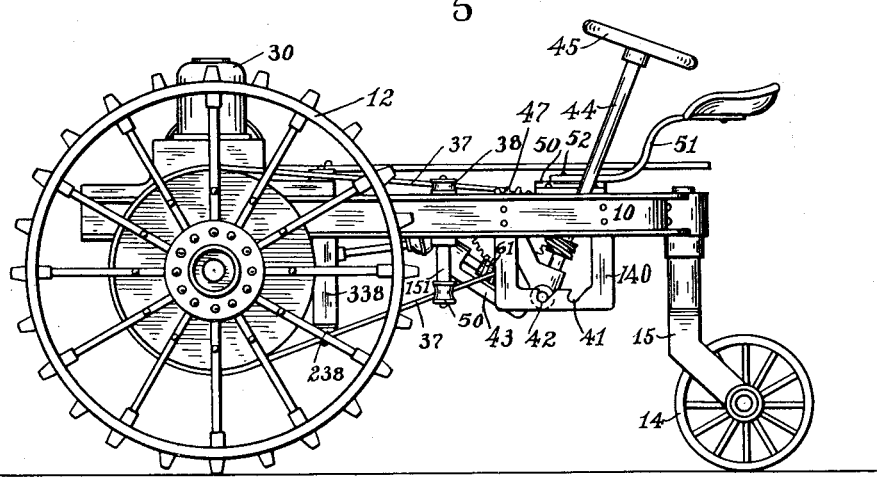

B. P. & F. I. REMY.
TRACTOR.
APPLICATION FILED MAY 1, 1913.

1,182,104.

Patented May 9, 1916.
3 SHEETS—SHEET 1.

WITNESSES:
A. H. Edgerton
J. A. Boyle

INVENTORS
Frank I Remy
Benjamin P Remy.
BY
V. H. Lockwood
ATTORNEY

B. P. & F. I. REMY.
TRACTOR.
APPLICATION FILED MAY 1, 1913.

1,182,104.

Patented May 9, 1916.
3 SHEETS—SHEET 2.

WITNESSES:
A. H. Edgerton
J. A. Boyle

INVENTORS
Frank I. Remy +
Benjamin P. Remy
BY
V. H. Lockwood
ATTORNEY

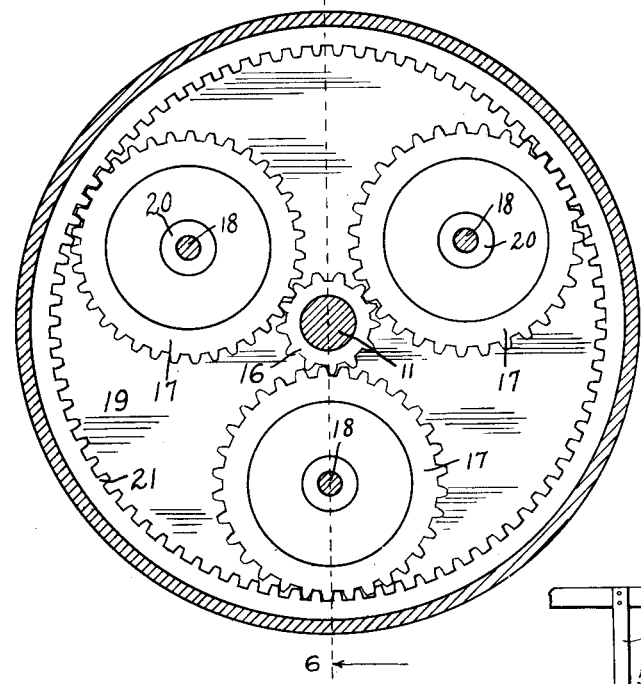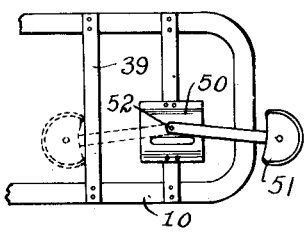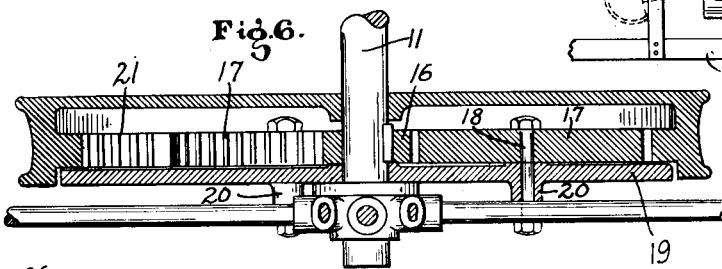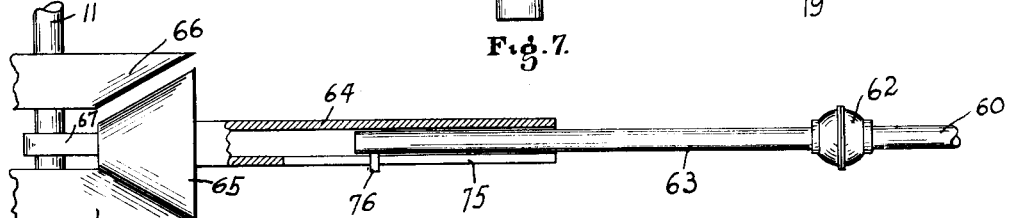

UNITED STATES PATENT OFFICE.

BENJAMIN P. REMY AND FRANK I. REMY, OF ANDERSON, INDIANA.

TRACTOR.

1,182,104.  Specification of Letters Patent.  Patented May 9, 1916.

Application filed May 1, 1913. Serial No. 764,858.

*To all whom it may concern:*

Be it known that we, BENJAMIN P. REMY and FRANK I. REMY, citizens of the United States, and residents of Anderson, county of Madison and State of Indiana, have invented a certain new and useful Tractor; and we do hereby declare that the following is a full, clear, and exact description thereof, reference being had to the accompanying drawings, in which like letters refer to like parts.

The object of this invention is to improve the construction of tractors and other self driven vehicles in the matter of steering and controlling the operation of the same.

One feature of the invention consists in providing a vehicle of the kind wherein the two main drive wheels are driven through planetary gears, and means is provided for controlling the drums or reaction members of the planetary gears so that the drums may revolve, be held stationary, or be made to turn at different speeds or in the same or opposite directions. Therefore, by permitting the planetary gear drums to revolve, no power will be transmitted through the planetary gears to the drive wheels of the vehicle and they will not move. By holding both planetary gear drums stationary, they will transmit power to the drive wheels and propel them alike. By turning the planetary gear drums at different speeds or in opposite directions, or holding one drum and permitting the other to revolve, the drive wheels will be accordingly and independently propelled or retarded from moving so that the vehicle will turn.

While the invention herein shown and described utilizes a cable extending around the drums of the planetary gears for controlling the same, they may be otherwise actuated or controlled. Also there is shown a windlass about which said cable passes for operating the cable, and causing it to turn the drums. In connection with the cable and windlass, means is provided for moving the windlass so as to relax the cable or gear drums when desired, and this means is preferably controlled by a steering shaft which actuates the windlass and also is arranged to move the windlass. Also power driven means is provided for actuating the windlass, if desired.

Along with the foregoing is the further feature of arranging the steering shaft of the wheel and seat so that they can be reversed and enable one to drive the vehicle in either direction.

The nature of the invention will be understood from the accompanying drawings and the following description and claims.

Figure 2:
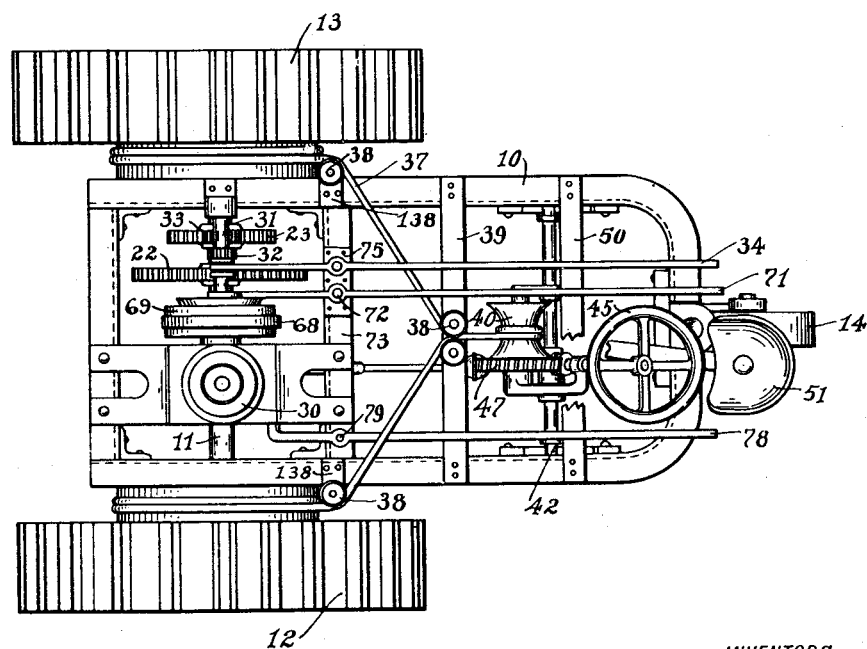
Figure 3:
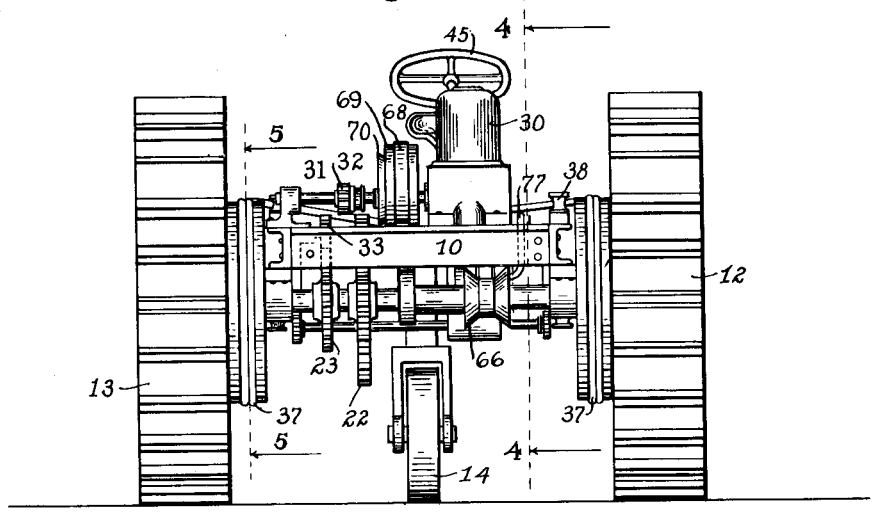
Figure 4:
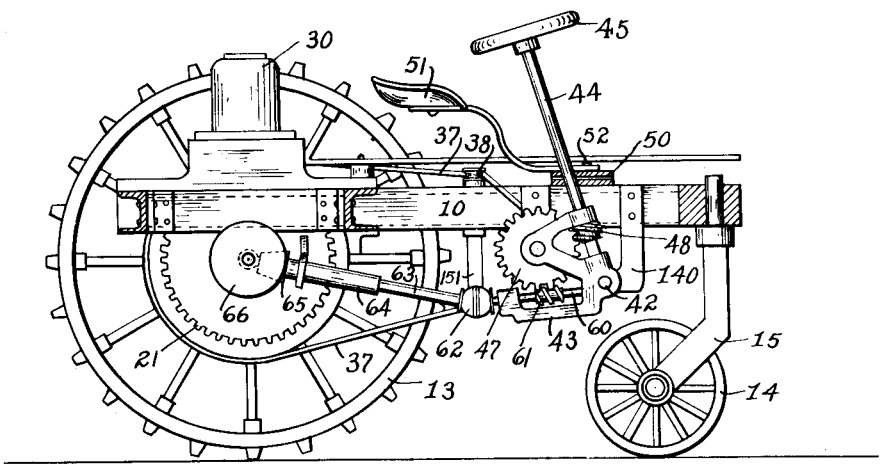

In the drawings, Figure 1 is a side elevation. Fig. 2 is a plan view of the machine. Fig. 3 is a front elevation of the machine as shown in Fig. 1. Fig. 4 is a section on the line 4—4 of Fig. 3, showing the machine arranged, however, to travel in the opposite direction from that shown in Fig. 1. Fig. 5 is a section on the line 5—5 of Fig. 3, but on a larger plan. Fig. 6 is a section on the line 6—6 of Fig. 5, parts being broken away. Fig. 7 is a view partly in section and partly in plan of the friction driving means. Fig. 8 is a plan view with parts omitted.

This tractor has a main frame 10 supported by a driving axle 11 propelling two drive wheels 12 and 13, and there is a caster wheel 14 supporting the other end of the frame through the caster wheel frame 15. Therefore, so far as these wheels are concerned, the machine can be driven in either direction with ease and facility, there being no change in the wheels excepting the turning of the caster wheel. The wheel 12 and the wheel 13 are each connected with the driving axle indirectly through the intermediation of a planetary gear mechanism, as shown in Fig. 5. The axle has on it the pinion 16 which meshes with three intermediate gears 17 mounted on stub axles 18, extending through the disk 19 and bosses 20 therefrom and secured to the spokes of the drive wheel. The intermediate gears 17 mesh with an internal gear 21 which is loosely mounted on the axle 11, see Fig. 6, and the outer periphery is herein called a cable drum. The axle 11 has secured on it a forward driving gear 22 and a reversing gear 23.

Upon the main frame there is an engine 30 mounted, having an engine shaft 31 and a pinion 32 splined slidably thereon into position to engage the gear 22 for driving the machine in one direction. The pinion 32 can be moved also into mesh with the pinion 33 which is in mesh all the time with the gear 23 so as to reverse the direction of the travel of the machine. The pinion 32 is shifted by a lever 34, as shown in Fig. 2.

A cable 37 surrounds each cable drum a plurality of times and passes the upper sheaves 38 secured on the bracket 138 on the sides of the frame 10, and the lower part of the cable passes the sheaves 238 on the lower ends of the arms 338 extending down from the frame, and extends in an inclined direction between the sheaves 38 on the cross bar 39, said sheaves 38 being midway of the machine, and thence over a windlass 40 a plurality of times.

On the under side of the main frame there is an auxiliary frame 140 having in it two pairs of notches 41 inclined downwardly and rearwardly, one pair of notches being in front of the other. These notches are to receive and seat the spindles 42 extending laterally from a movable frame 43 in which the steering shaft 44 is rotatably mounted. There is a wheel 45 on the upper end of said steering shaft, and the steering shaft passes through the frame 43, in which the windlass 40 is mounted. At the side of the windlass 40 there is secured a worm gear 47 which is engaged by the worm wheel 48 on the steering shaft 44, so that power can be transmitted between the steering shaft and the windlass.

Upon the cross bar 50 of the main frame a driver's seat 51 is pivotally mounted by a pin 52, so that said seat can be turned around 180 degrees and cause the seat to face in either direction, as indicated in Figs. 1 and 4, and without interfering with the steering shaft. When the machine travels so that the caster wheel trails, the parts are as shown in Fig. 1 with the seat over the caster wheel and the steering shaft inclined toward the caster wheel end of the frame, and with the spindles 42 in the notches 41 which are remote from the caster wheel end of the machine, as seen in Fig. 1. That causes the frame 43 to throw the windlass up in an elevated position, and the steering shaft and frame 43 and windlass are oscillatable so that the cable can be tightened or relaxed. It gives the operator control of the cable and planetary gears. On the other hand, the seat can be turned around and face in the opposite direction, as shown in Fig. 4, and the frame 43 is changed so that the spindles 42 will be in the right-hand notches 41 and the steering shaft will incline in the opposite direction from that shown in Fig. 1. In this position the device can be operated in the same manner, the cable being tightened by pushing on the steering wheel instead of pulling on it, as in the other position. While the cable on the upper side passes between the pulleys 38, the cable on the lower side passes between the pulleys 50 on the lower end of arms 151 extending down from the cross-bar 39, as shown in Fig. 1. The advancement of the frame 43 from the left-hand notches 41 to the right-hand notches 41, in changing from the position shown in Fig. 1 to that shown in Fig. 2, will still cause substantially the same tautness in the cable as in Fig. 1, such advancement offsetting the downward movement of the windlass resulting from such change.

In operation, if the cable is held tight on both planetary gears, the tractor will advance. If the cable be relaxed on both, the tractor will stop. If one is driving with the parts as shown in Fig. 1, and wishes to turn to the right, he will turn the steering wheel so as to cause the cable to turn the left-hand drum faster and turn the right-hand drum more slowly and that will cause the left-hand wheel to travel faster than the other wheel and effect the turn. Opposite operation of the steering wheel would cause the opposite result. He has entire control of the degree of tightness he shall give to the cable and its movement so that he can control the operation and speed, as desired.

There is also provided in this machine means for operating the windlass 40 from the engine instead of doing it by hand, and in that event the steering shaft is used only for moving the windlass. In the frame 43 there is a shaft 60 mounted which carries a worm wheel 61, meshing at all times with the worm gear 47 secured to the windlass. This shaft 60 is connected by a universal joint 62 with a reduced shaft 63 which telescopes in the tubular shaft 64 which carries on its end a beveled friction wheel 65, adapted to engage one side or the other of the beveled friction drum 66 which is mounted loosely on the axle 11 and driven by a belt 68 on a pulley 69 running loosely on the engine shaft 31, and adapted to be clutched therewith by a friction clutch 70 which is shifted by a clutch lever 71 pivoted at 72 on a cross bar 73 of the main frame. The tubular shaft 64 has in it a longitudinal slot 75 through which a pin 76 extends from the shaft 63, so that these two shafts, 63 and 64, telescope and adjust themselves to positions of the frame 43. The shaft 64 is mounted at its inner end on the reduced central portion of the friction drum 66 by a loose strap 67 which does not interfere with the lateral shifting of the friction cone 65. Said cone is shifted by the downwardly turned arm 77 on the inner end of a lever 78 fulcrumed to bar 73 at 79, see Figs. 2 and 3.

When it is desired to operate the windlass 40 from the engine, the lever 71 is actuated for clutching the shaft 31 into engagement with the pulley 69. Then the double friction wheel 66 will operate and the cone friction 65 can be thrown into engagement with either side of that drum by the lever 78, so as to operate the windlass in either direction for steering the machine while making turns. When running straight ahead the cone 65 will be disengaged from the double friction wheel 66.

The drawings herein show the general nature and features of this invention, but the invention is not intended to be limited to the details of construction herein, for many minor features of the construction can be altered without departing from the spirit of the invention. This is particularly true with reference to the means for controlling the gear drums, as any means might be employed besides the cable, and also for the mounting of the planetary gears as they do not need to be mounted on the main axle or shaft.

The invention is:

1. A vehicle provided with a pair of driving wheels, a planetary gear through which power is transmitted for driving each drive wheel, the outer member of each planetary gear having a drum, and means engaging said drum for simultaneously controlling said planetary gears.

2. A vehicle provided with a pair of drive wheels, planetary gearing with a cable drum for each wheel, an endless cable surrounding both drums, and means for controlling the action of the cable on both drums.

3. A vehicle provided with a pair of drive wheels, planetary gearing with a cable drum for each wheel, an endless cable surrounding both drums, and means for operating said cable so that it may hold or turn said drums as desired for steering the vehicle.

4. A vehicle provided with a pair of drive wheels, planetary gearing with a cable drum for each wheel, an endless cable surrounding both drums, a windlass for operating said cable so that it will tighten on said drums as desired, and means for operating said windlass.

5. A vehicle provided with a pair of drive wheels, planetary gearing with a cable drum for each wheel, an endless cable surrounding both drums, a windlass for operating said cable so that it will actuate or control said drums, and means for moving the position of said windlass to tighten or relax said cable on said drums.

6. A vehicle provided with a pair of drive wheels, planetary gearing with a cable drum for each wheel, an endless cable surrounding both drums, a windlass for operating said cable so that it will actuate or control said drums, and means for rotating and also for moving the position of said windlass.

7. A vehicle including a frame, a driving axle extending transversely thereto, a drive wheel at each side of the frame, planetary gearing for driving each drive wheel from said axle and having a cable drum, sheave wheels in connection with each side of the main frame in alinement with the brake drums, sheave wheels located centrally of the main frame, a windlass mounted in alinement with said central sheave wheels, and an endless cable surrounding said drums and passing the sheave wheels at the sides of the main frame and between the sheave wheels at the end of the main frame and about said windlass.

8. A vehicle including a main frame, drive wheels mounted at the sides thereof, planetary gearing with a cable drum for each drive wheel, an endless cable surrounding said drums, sheave wheels on the frame for guiding said cable, a windlass around which said cable extends, a rocking frame carrying said windlass, and means carried by said rocking frame for actuating the windlass.

9. A vehicle including a main frame, drive wheels mounted at the sides thereof, planetary gearing with a cable drum for each drive wheel, an endless cable surrounding said cable drum, sheave wheels on the frame for guiding said cable, a windlass around which said cable extends, a rocking frame carrying said windlass, means carried by said rocking frame for actuating the windlass, and means carried by said frame for rocking the same.

10. A vehicle including a main frame, drive wheels mounted at the sides thereof, planetary gearing with a cable drum for each drive wheel, an endless cable surrounding said drums, sheave wheels on the frame for guiding said cable, a windlass around which said cable extends, a rocking frame carrying said windlass, a steering shaft mounted in said rocking frame, a worm gear secured to said windlass, and a worm wheel on said steering shaft, whereby the steering shaft may move the windlass and actuate it.

11. A vehicle including a main frame, drive wheels mounted at the sides thereof, planetary gearing with a cable for each drive wheel, an endless cable surrounding said drums, sheave wheels on the frame for guiding said cable, a windlass around which said cable extends, a rocking frame carrying said windlass, an auxiliary stationary frame secured to the main frame with forward and rearward notches therein, spindles extending from the rocking frame adapted to fit in said notches so that said rocking frame may be mounted in either the front or rear notches, and means in said rocking frame for actuating the windlass.

12. A vehicle including a main frame, drive wheels mounted at the sides thereof, planetary gearing with a cable drum for each drive wheel, an endless cable surrounding said drums, sheave wheels on the frame for guiding said cable, a windlass around which said cable extends, a rocking frame carrying said windlass, an auxiliary stationary frame secured to the main frame with forward and rearward notches therein, spindles extending from the rocking frame adapted to fit in said notches so that said rocking frame may be mounted in either the front or rear notches, a steering shaft mounted in said rocking frame so that it can rock said frame and when said frame is changed from one of said notches to the other the inclination of the steering shaft will be correspondingly changed, and means for actuating the windlass.

13. A vehicle including a main frame, drive wheels mounted at the sides thereof, planetary gearing with a cable drum for each drive wheel, an endless cable surrounding said drums, sheave wheels on the frame for guiding said cable, a windlass around which said cable extends, a rocking frame carrying said windlass, an auxiliary stationary frame secured to the main frame with forward and rearward notches therein, spindles extending from the rocking frame adapted to fit in said notches so that said rocking frame may be mounted in either the front or rear notches, a steering shaft mounted in said rocking frame so that it can rock said frame and when said frame is changed from one of said notches to the other the inclination of the steering shaft will be correspondingly changed, a worm wheel secured to said windlass, and a worm wheel secured to said steering shaft for actuating the windlass.

14. A vehicle including a main frame, drive wheels mounted at the sides thereof, planetary gearing with a cable drum for each drive wheel, an endless cable surrounding said drums, sheave wheels on the frame for guiding said cable, a windlass around which said cable extends, a rocking frame carrying said windlass, an auxiliary stationary frame secured to the main frame with forward and rearward notches therein, spindles extending from the rocking frame adapted to fit in said notches so that said rocking frame may be mounted in either the front or rear notches, a steering shaft mounted in said rocking frame so that it can rock said frame and when said frame is changed from one of said notches to the other the inclination of the steering shaft will be correspondingly changed, means for actuating the windlass, and a seat reversibly mounted on said frame so that it can face in either direction.

15. A vehicle including a main frame, drive wheels mounted at the sides thereof, planetary gearing with a cable drum for each drive wheel, an endless cable surrounding said drums, sheave wheels on the frame for guiding said cable, a windlass around which said cable extends, a rocking frame carrying said windlass, an auxiliary stationary frame secured to the main frame with forward and rearward notches therein, spindles extending from the rocking frame adapted to fit in said notches so that said rocking frame may be mounted in either the front or rear notches, a steering shaft mounted in said rocking frame so that it can rock said frame and when said frame is changed from one of said notches to the other the inclination of the steering shaft will be correspondingly changed, means for actuating the windlass, and a seat with its support pivoted on said main frame near the steering shaft so that it can swing around laterally to face in either direction.

16. A vehicle including a main frame, drive wheels at the sides thereof, an engine on said frame, planetary gearing for driving each drive wheel from the engine including a cable drum, an endless cable surrounding said drums, a windlass over which said cable passes and whereby the cable is operated, and means for driving the windlass from the engine.

17. A vehicle including a main frame, drive wheels at the sides thereof, an engine on said frame, planetary gearing for driving each drive wheel from the engine including a cable drum, an endless cable surrounding said drums, a windlass over which said cable passes and whereby the cable is operated, and friction means for driving the windlass from the engine so that the engine driving means may slip, if necessary.

18. A vehicle including a main frame, drive wheels at the sides thereof, an engine on said frame, planetary gearing for driving each drive wheel from the engine including a cable drum, an endless cable surrounding said drums, a windlass over which said cable passes and whereby the cable is operated, a double friction wheel driven by the engine, a friction cone disk adapted to engage either side of said friction wheel, and a shaft for transmitting power from said friction cone to the windlass.

19. A vehicle including a main frame, drive wheels at the sides thereof, an engine on said frame, planetary gearing for driving each drive wheel from the engine including a cable drum, an endless cable surrounding said drums, a windlass over which said cable passes and whereby the cable is operated, a double friction wheel driven by the engine, a friction cone disk adapted to engage either side of said friction wheel, and a flexible shaft for transmitting power from said friction cone to said windlass.

20. A vehicle including a main frame, drive wheels at the sides thereof, an engine on said frame, planetary gearing for driving each drive wheel from the engine including a cable drum, an endless cable surrounding said drums, a windlass over which said cable passes and whereby the cable is operated, a double friction wheel driven by the engine, a friction cone disk adapted to engage either side of said friction wheel, means for mounting said windlass so that it can be moved, and a telescoping flexible shaft for transmitting power from said friction cone to said windlass.

In witness whereof, we have hereunto affixed our signatures in the presence of the witnesses herein named.

BENJAMIN P. REMY.
FRANK I. REMY.

Witnesses:
WILLIAM R. POLAND,
RUTH I. MILLER.